UNITED STATES PATENT OFFICE.

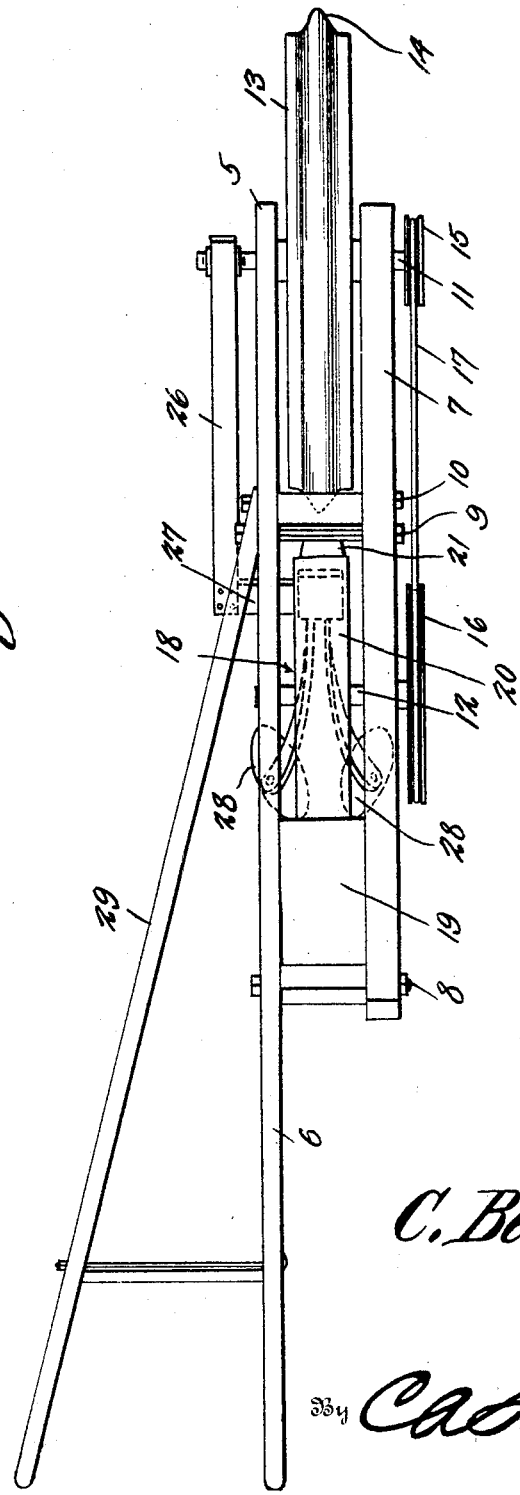

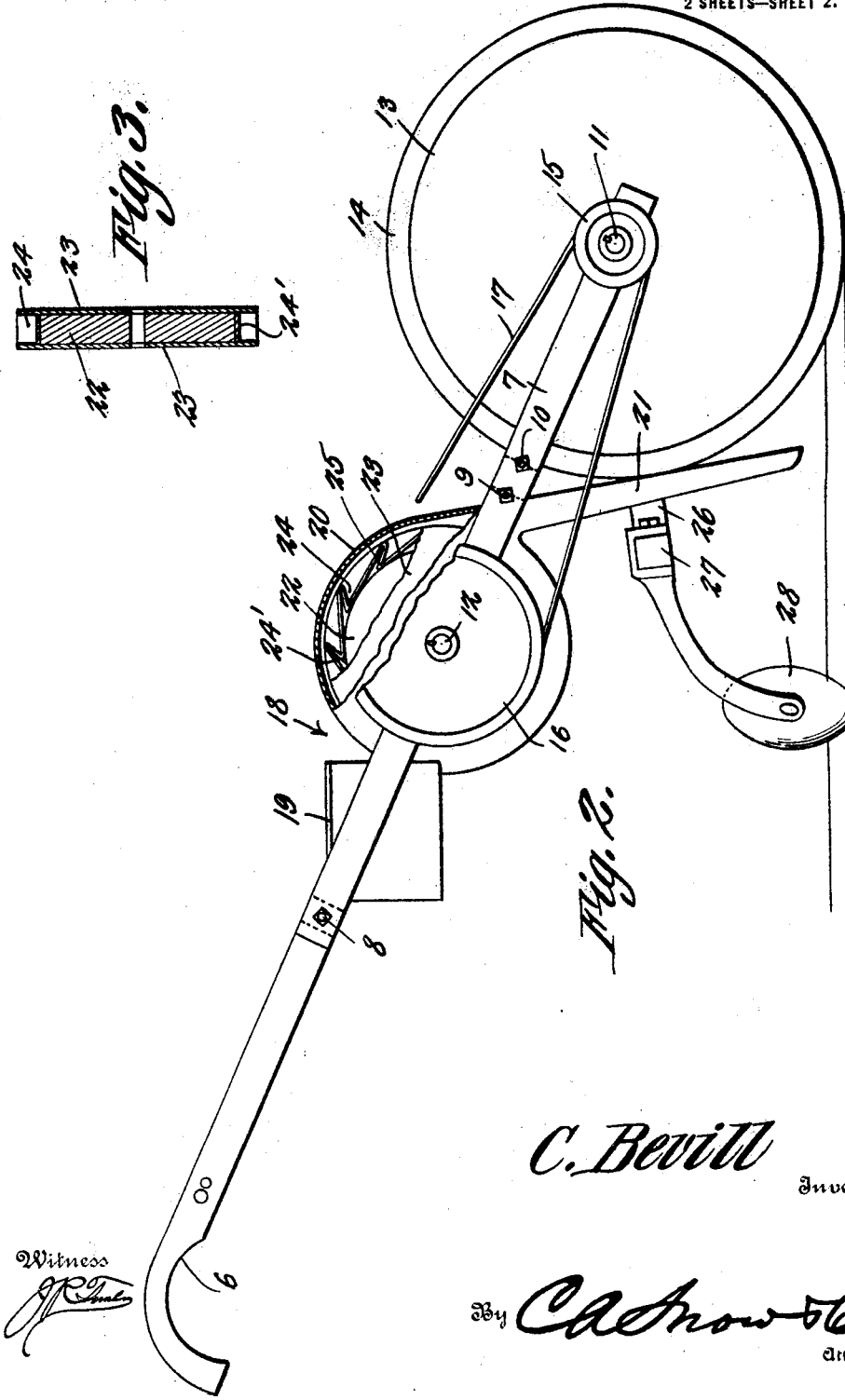

CLAIBOURN BEVILL, OF BUSHNELL, FLORIDA.

FERTILIZER-DISTRIBUTER.

1,381,392.

Specification of Letters Patent. Patented June 14, 1921.

Application filed March 13, 1919. Serial No. 282,354.

*To all whom it may concern:*

Be it known that I, CLAIBOURN BEVILL, a citizen of the United States, residing at Bushnell, in the county of Sumter and State of Florida, have invented a new and useful Fertilizer-Distributer, of which the following is a specification.

My invention relates to seed and fertilizer distributers and its principal object is to provide a machine of this character which will drop the seed or fertilizer at uniformly spaced distances in the ground.

A second object of the invention is to provide a planter or seeder which will cover the furrows having the seed deposited therein after the dropping operation.

A further object of the invention is to provide a planter which is automatic in operation and which may be pushed over the drilled land by hand.

A still further object of the invention is to provide a seeder and fertilizer distributer which is constructed so that the operator may walk to one side of the drilled land and not be forced to walk directly behind the machine on the soft drilled land.

Another object of the invention is to provide a machine of the above character which is simple in construction, consists of few parts which may be readily assembled and disassembled, and which may be manufactured and sold at a minimum cost.

The above and other objects and advantages of the invention will be fully apparent from the following specification and accompanying drawing.

The invention consists of the combination of parts, constructions, arrangements, and general assemblage which will be hereinafter specifically referred to and illustrated in the accompanying drawings wherein:

Figure 1 is a top elevation of a planter constructed in accordance with my invention.

Fig. 2 is a side elevation of the same, parts being broken away.

Fig. 3 is a sectional view of the seed dropping disk used in connection with the invention.

Referring in detail to the drawing wherein like characters of reference indicate like parts, the numeral 5 designates a beam which terminates in a laterally extending handle 6. Arranged in parallel relation to the beam 5 is a short beam 7 which is connected to the latter through the medium of a bolt 8.

Bolts 9 and 10 extend through the beams 5 and 6 at the middle of the latter. A shaft 11 also extends through these beams at their forward ends while a shaft 12 extends through the beams between the bolts 8 and 9. Fixed to rotate on the shaft 11 between the beams 5 and 6 is a wheel 13 which is formed with a furrow forming circumferential V shaped rim 14. A pulley 15 is also fixed upon the shaft 11, which is operatively connected with the large pulley wheel 16 on the shaft 12 through the medium of a belt 17.

Supported between the beams 5 and 6 is a hopper 18 for containing the seed or fertilizer to be distributed. This hopper is formed with a rectangular part 19, from which depends a semi-circular part 20 which terminates into a discharge spout 21 at its forward end. The discharge spout extends downwardly behind the wheel 16.

Rotatable with the shaft 12 in the part 20 of the hopper is a disk 22 which has circular guide plates 23 secured to its opposite faces. The edges of these plates project beyond the edge of the disk 22. Seed pockets 24 are formed between the edges of the plates 23 by extending a strip of metal 24 around the periphery of the disk and bending the same upon itself as at 25 and then extending it reversely and tangentially with respect to the disk.

Depending downwardly from the shaft 11 is a bar 26 from which extends a second bar 27 that is positioned behind the discharge spout 21. Trailing behind the discharge spout and carried by the bar 27 is a pair of angularly disposed disks 28, the purpose of which is to cover the furrows in the ground after the seed have been dropped therein.

A handle 29 is connected with the beam 5 and extends at an angle to the same and to the left of the beam.

The construction illustrated and described is considered to be the preferred embodiment of the invention but it is to be understood that this disclosure is merely illustrative and that the invention may be modified in as many respects as may be embodied in the sub-joined claim.

What is claimed is:

A fertilizer distributer including parallel spaced beams fixedly connected, said beams being straight and one of them extended beyond the other to constitute a handle, a handle connected to the forward portion of said extended beam and diverging rearwardly therefrom, a ground wheel journaled between the forward ends of the beams, a housing fixedly secured between said beams and back of the wheel, a discharge spout extending downwardly from the housing and back of the wheel, a disk mounted for rotation within the housing, pulleys revoluble with the disk and wheel respectively, means for transmitting motion from one pulley to the other, said disk having feed pockets in its periphery, a rearwardly extending bar mounted to swing about the axis of rotation of the wheel and located outside of the space between the beams, a laterally extending member at the rear end of said bar and projecting back of the wheel, and covering means carried by said member.

In testimony that I claim the foregoing as my own, I have hereto affixed my signature in the presence of two witnesses.

CLAIBOURN BEVILL.

Witnesses:
J. F. AKINS,
A. J. BURNHAM.